United States Patent [19]

Sato et al.

[11] Patent Number: 4,578,926
[45] Date of Patent: Apr. 1, 1986

[54] APPARATUS FOR PACKAGING, WEIGHING AND LABELING MERCHANDISE

[75] Inventors: Hirokazu Sato, Kyoto; Kazuo Koyama, Shiga, both of Japan

[73] Assignee: Kabushiki Kaisha Ishida Koki Seisakusho, Kyoto, Japan

[21] Appl. No.: 584,397

[22] Filed: Feb. 27, 1984

[30] Foreign Application Priority Data

Mar. 2, 1983 [JP] Japan ................................. 58-35089
Mar. 2, 1983 [JP] Japan ............................ 58-30614[U]

[51] Int. Cl.⁴ ......................... B65B 1/32; B65B 61/26
[52] U.S. Cl. ...................................... 53/502; 53/137; 198/406; 198/416
[58] Field of Search .......................... 53/137, 502, 167; 198/416, 456, 406

[56] References Cited

U.S. PATENT DOCUMENTS

| | | | |
|---|---|---|---|
| 2,190,418 | 2/1940 | Davidson et al. | 198/416 X |
| 2,767,666 | 10/1956 | Rhodes | 198/416 X |
| 3,128,868 | 4/1964 | Bowen | 198/416 X |
| 3,732,966 | 5/1973 | Treiber | 53/137 X |
| 3,934,717 | 1/1976 | Katagiri et al. | 198/416 |
| 4,086,744 | 5/1978 | Seragnoli | 53/137 |
| 4,415,048 | 11/1983 | Teraoka | 53/137 X |

*Primary Examiner*—Horace M. Culver
*Attorney, Agent, or Firm*—Browdy and Neimark

[57] ABSTRACT

Merchandise discharged from a packaging machine in a lateral posture can be reliably aligned into a longitudinal posture, and the merchandise can then be sent to a labeling machine with one side of each article in sliding contact with an article-aligning member at all times, irrespective of the size of tray used. This enables the omission of the operations of correcting the posture and position of articles by an operator, and the articles can always be labeled at correct portions thereof, said turn conveyor is so formed that the height of a start end thereof can be regulated to enable the turn conveyor, alignment conveyor, weighing machine and labeling machine to be connected to a packaging machine which has an article discharge section at a height different from that of the turn conveyor or an intermediate conveyor connected to the discharge section of the packaging machine.

7 Claims, 11 Drawing Figures

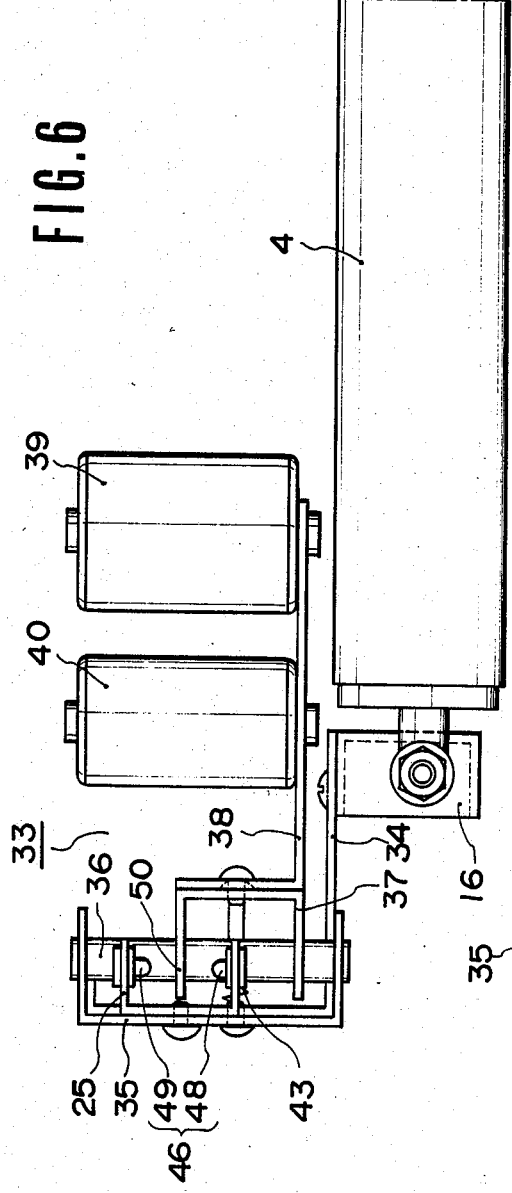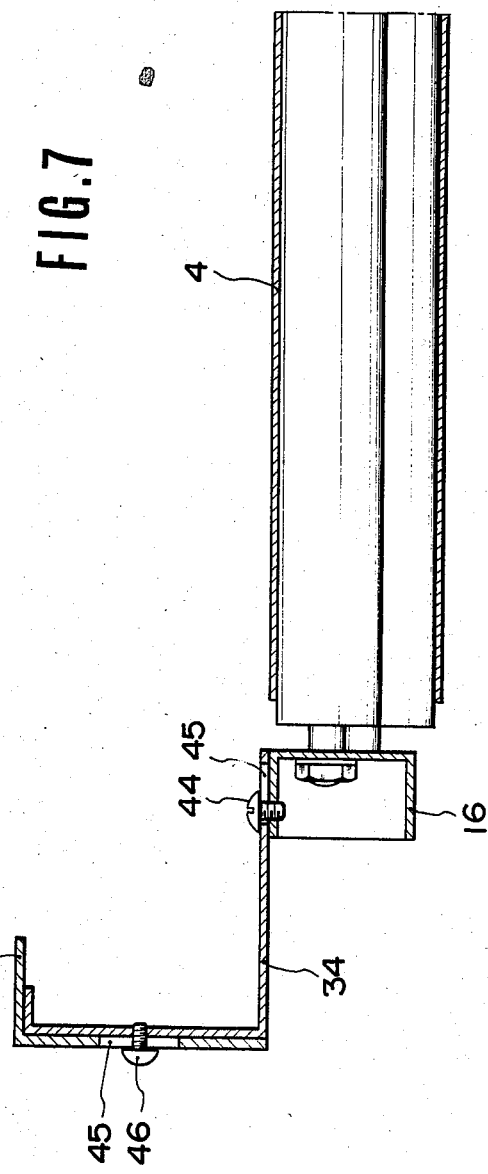

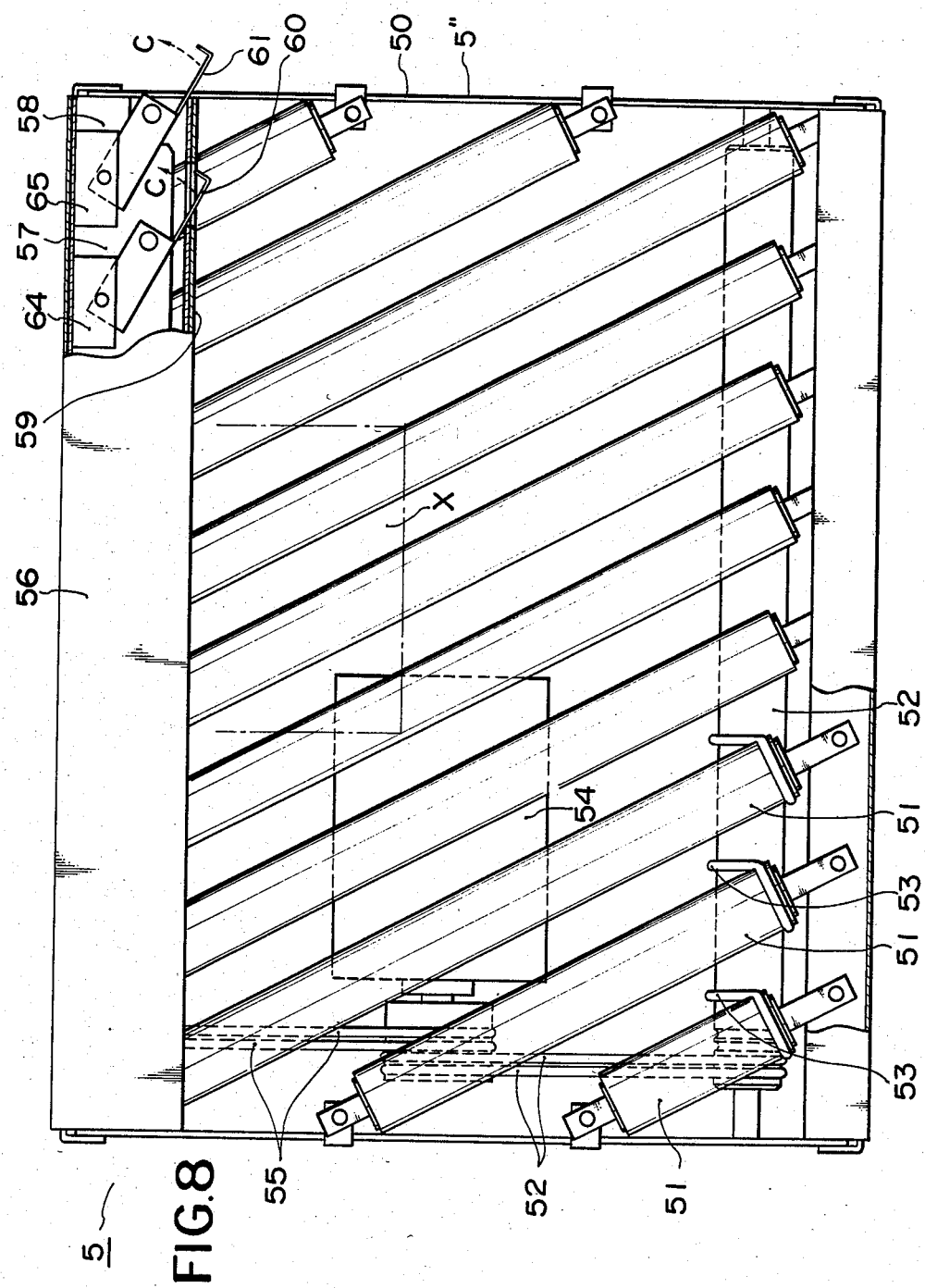

APPARATUS FOR PACKAGING, WEIGHING AND LABELING MERCHANDISE

BACKGROUND OF THE INVENTION

1. Field of the Invention

This invention relates to an apparatus which can continuously carry out the operations of packaging, weighing and labeling merchandise.

2. Description of the Prior Art

An apparatus consisting of a combination of a packaging machine, a weighing machine and a labeling machine which can continuously carry out the operations of packaging merchandise placed in trays, weighing the packaged merchandise and sticking thereon labels on which prices corresponding to the weights determined by the weighing operation are printed, is used in, for example, a packing center for goods distributed to supermarkets.

However conventional apparatus of this kind has the following problems.

Namely, an article placed in a tray is supplied with the article extending laterally with respect to the inlet of the packaging machine, i. e. with the longer sides of the tray extending at right angles to the direction in which the article is being supplied.

Accordingly, the article is still in a lateral posture when it leaves the packaging machine. The reasons why the article is supplied into and discharged from the packaging machine in a lateral posture with respect to the direction of advancement thereof reside in the fact that the packaging machine is so constructed that it can package and seal the merchandise passing therethrough in a lateral posture more efficiently.

If articles are in this lateral posture, their orientation is often disordered while they are transferred from the packaging machine to the labeling machine via the weighing machine.

Consequently, the labels are inevitably stuck on different portions of different articles by the labeling machine, or the wrong labels are stuck on. Therefore, it is necessary that the apparatus of this kind is constructed that an article in a lateral posture can be rotated into a longitudinal posture in a portion of the apparatus which is between the packaging machine and the weighing machine, so that each article is sent to the labeling machine at a predetermined positional relationship with respect to adjacent articles.

However, since the size of trays used in this apparatus is not constant, it is very difficult to send articles to the labeling machine while maintaining the posture thereof and positional relationship therebetween at an optimum at all times. Thus, in a conventional apparatus of this kind, the operator must often correct the posture and position of articles being sent to the labeling machine.

SUMMARY OF THE INVENTION

The present invention has been developed with a view to solving these problems in a conventional apparatus of this kind. The apparatus according to the present invention is characterized in that it is provided with a turn conveyor interposed between a packaging machine and a weighing machine which has a posture control mechanism for re-orientating merchandise sent out in a lateral posture from a discharge section of the packing machine into a longitudinal posture, and an alignment conveyor having at one side a guide wall along which merchandise in the longitudinal posture is aligned.

BRIEF DESCRIPTION OF THE DRAWINGS

FIG. 6 is a side elevation of a principal portion of the embodiment;
FIG. 7 is a longitudinal section taken along the line of FIG. 5.
FIG. 8 is an enlarged plan view of an alignment conveyor.

DETAILED DESCRIPTION OF THE EMBODIMENT

Figure 1:
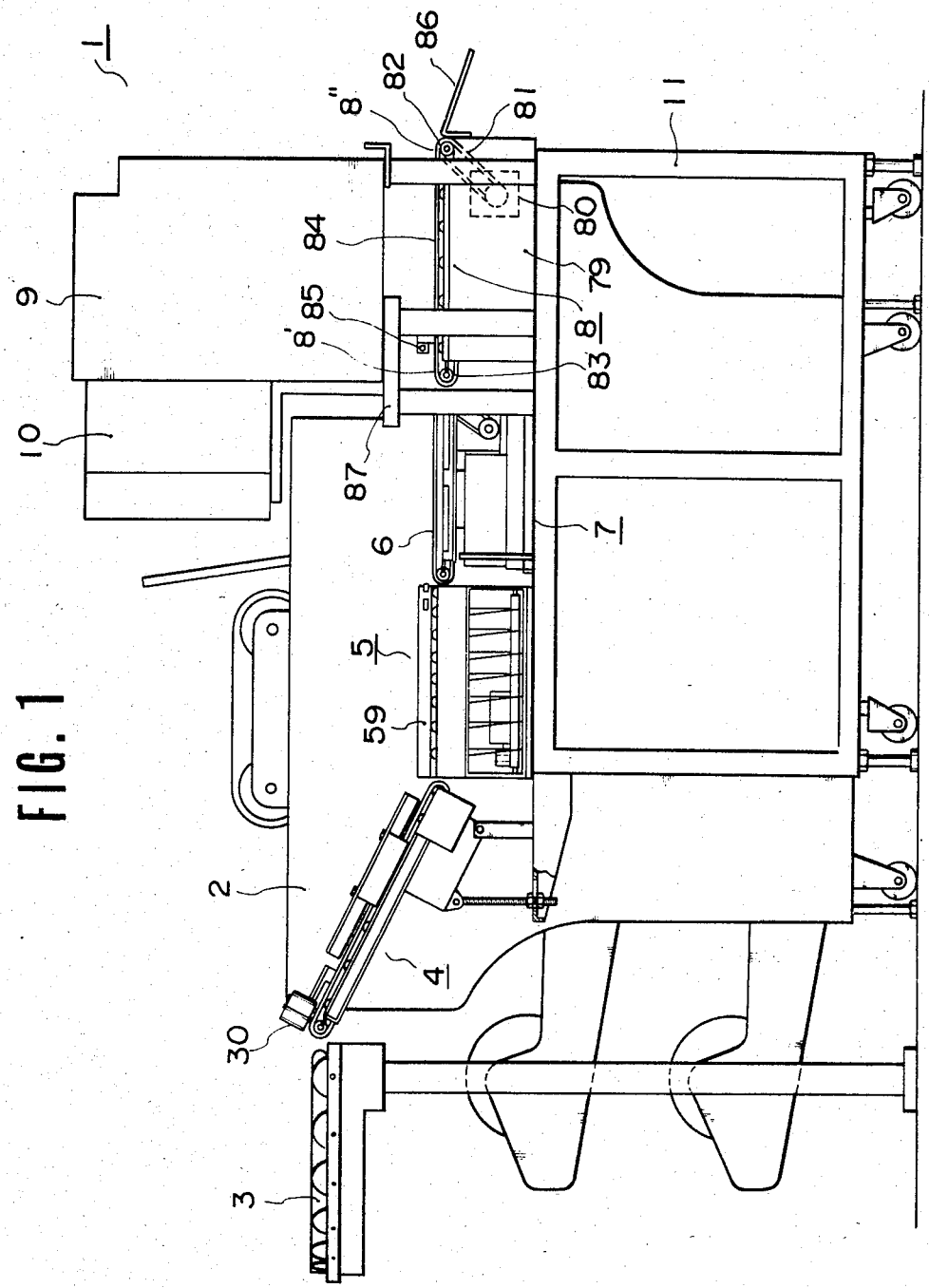
FIG. 1 is a side elevation of the embodiment as a whole.

The present invention will now be described on the basis of an embodiment thereof illustrated in the drawings.

Figure 2:
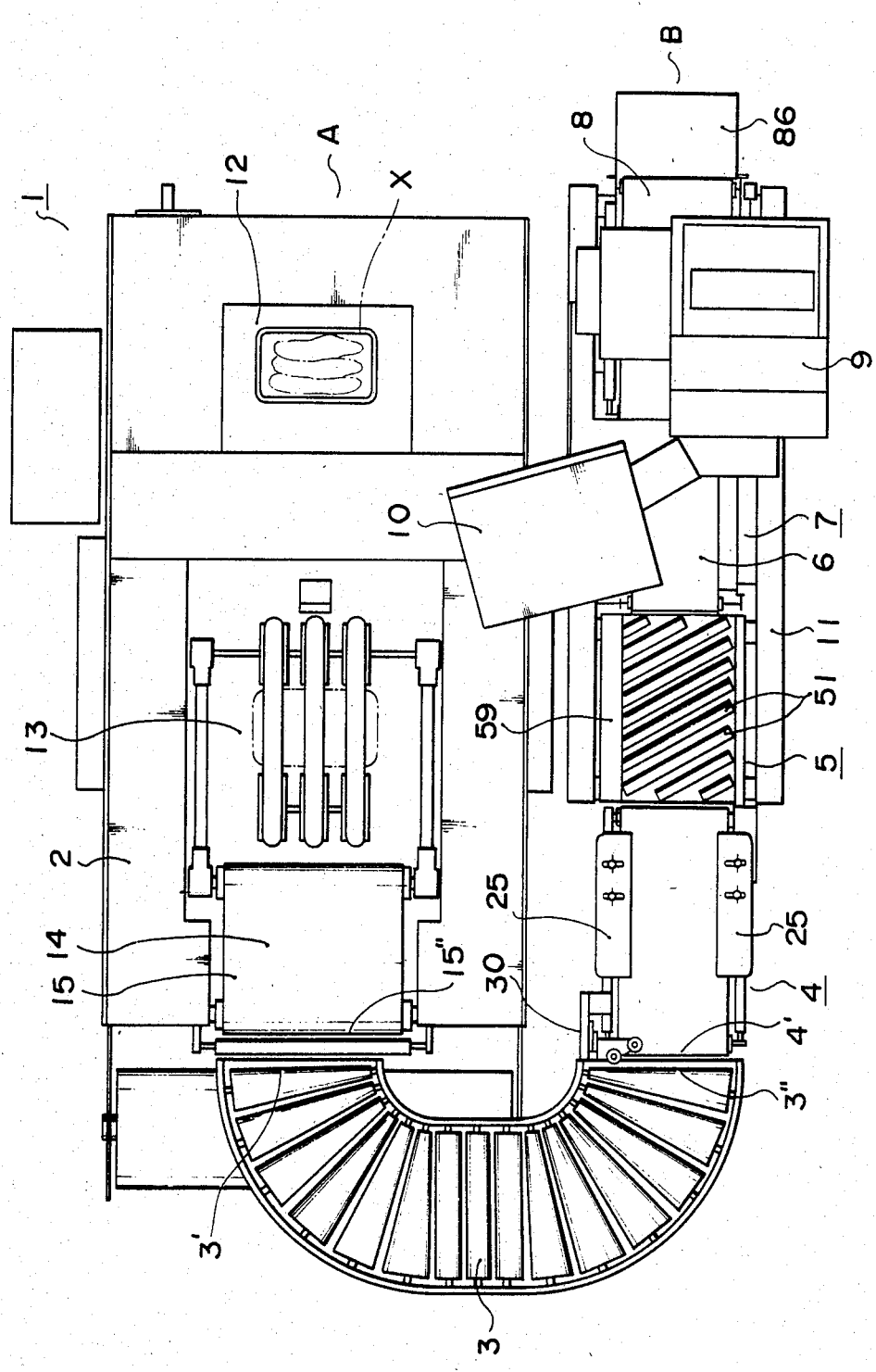
FIG. 2 is a plan view of the embodiment as a whole.

As shown in FIGS. 1 and 2, an apparatus 1 for packaging, weighing, and labeling merchandise is provided with a packaging machine 2, a U-shaped intermediate conveyor 3 connected to the packaging machine 2, an inclined turn conveyor 4 connected to the intermediate conveyor 3, an alignment conveyor 5 connected to the turn conveyor 4, a weighing machine 7 provided with a weighing conveyor 6 connected to the alignment conveyor 5, a discharge conveyor 8 connected to the weighing conveyor 6, a labeling machine 9 positioned above the discharge conveyor 8, and a control box 10.

In the apparatus 1, a U-shaped transfer passage is formed by the packaging machine 2, the intermediate conveyor 3, the turn conveyor 4, the alignment conveyor 5, the weighing conveyor 6 and the discharge conveyor 8, the passage extending from a feed position A to a discharge position B which is adjacent to the feed position A.

The conveyors and machines in the series starting from the turn conveyor 4 and ending with the discharge conveyor 8, and the labeling machine 9 and the control box 10 are mounted on common stand 11.

The packaging machine 2 is provided, as shown in FIG. 2, with an article feed section 12 at the end thereof which is nearest the feed position A, a packaging section 13 at an intermediate portion thereof, and a sealing section 14 at the other end thereof. A start end 3' of the intermediate conveyor 3 is connected to a terminal end 15' of a discharge conveyor 15" in the sealing section 14, i. e. an article discharge section for the packaging machine 2.

Figure 3:
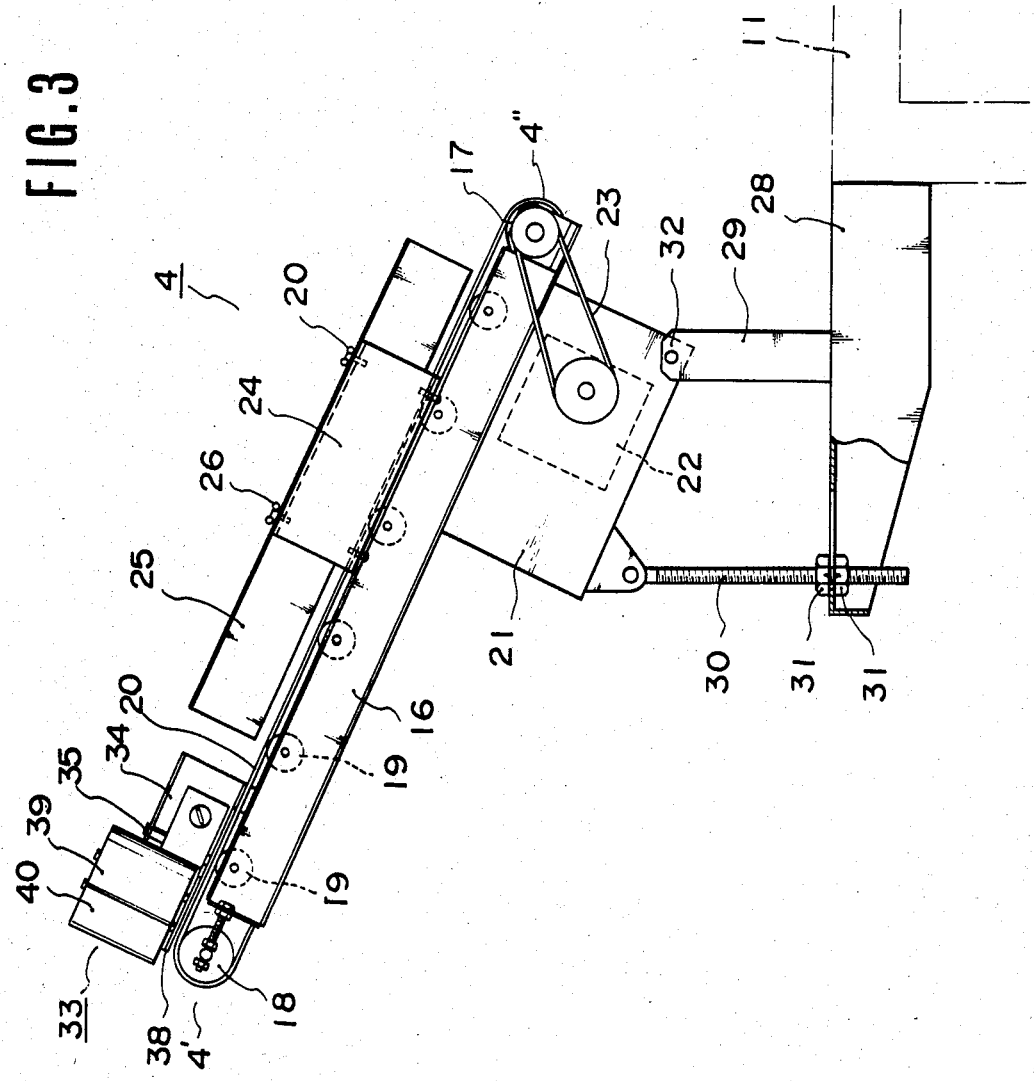
FIG. 3 is a side elevation view of a turn conveyor.
Figure 4:
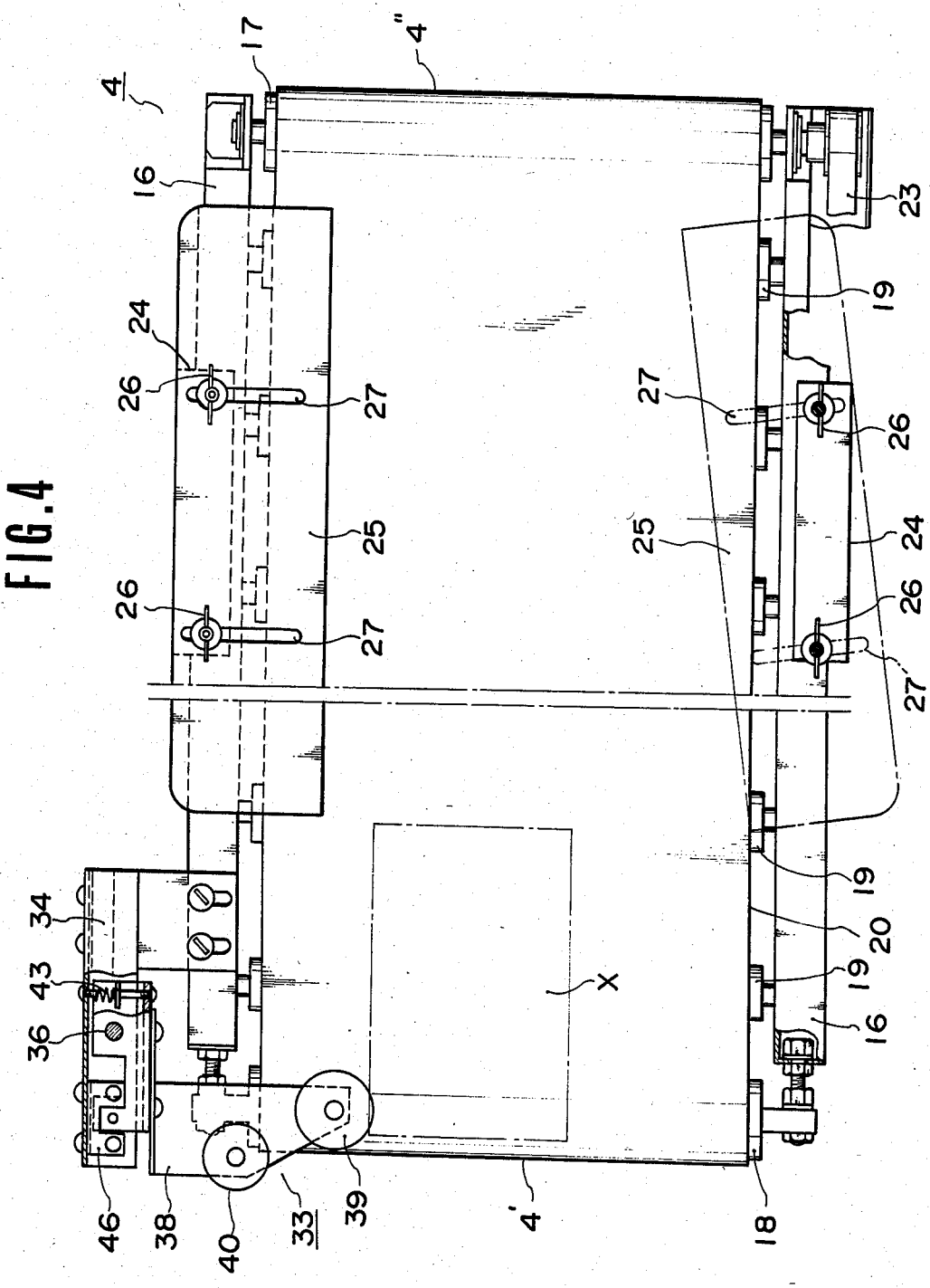
FIG. 4 is an enlarged plan view of a turn conveyor.

The turn conveyor 4 connected to a terminal end 3" consists, as shown in FIGS. 3 and 4 of right and left frames 16; a driving roller 17 provided at a terminal end 4", a driven roller 18 provided at a start end 4', and a plurality of belt-receiving rollers 19 provided between the rollers 17, 18, all of which are supported rotatably between the frames 16; and a belt wrapped around the driving roller 17 and driven roller 18.

A motor 22 is provided on a lower frame 21 which connects the frames 16, and rotates the driving roller 17 via a belt 23. The frames 16 are further provided with guide plates 25 fixed thereto by brackets 24 and a plurality of thumb bolts 26. Since holes 27 through which the bolts 26 are inserted to attach the guide plates 25 to the brackets 24 are elongated, the distance between the guide plates 25 can be regulated, or the guide plates 25 can each be fixed at an angle with respect to the side frames 16.

The turn conveyor 4 as a whole is connected pivotably by its lower frame 21 to a bracket 29 provided vertically on a mount 28 formed integrally with the stand 11.

A screw rod 30 extending pivotably in the downward direction from the lower frame 21 is supported firmly on the mount 28 by lock nuts 31.

Accordingly, when the lock nuts 31 are loosened so as to move the screw rod 30 vertically with respect to the mount 28, the conveyor 4 as a whole is rotated about a pivot 32 by which the lower frame 21 and the bracket 29 are connected together. Thus, the height of the start end 4' can be regulated.

A posture control unit 33 re-orientates an article sent thereto in a lateral posture from the packaging machine 2 via the intermediate conveyor 3 into a longitudinally posture, and is provided in a corner of one side of a start end 4' of the turn conveyor 4.

Figure 5:
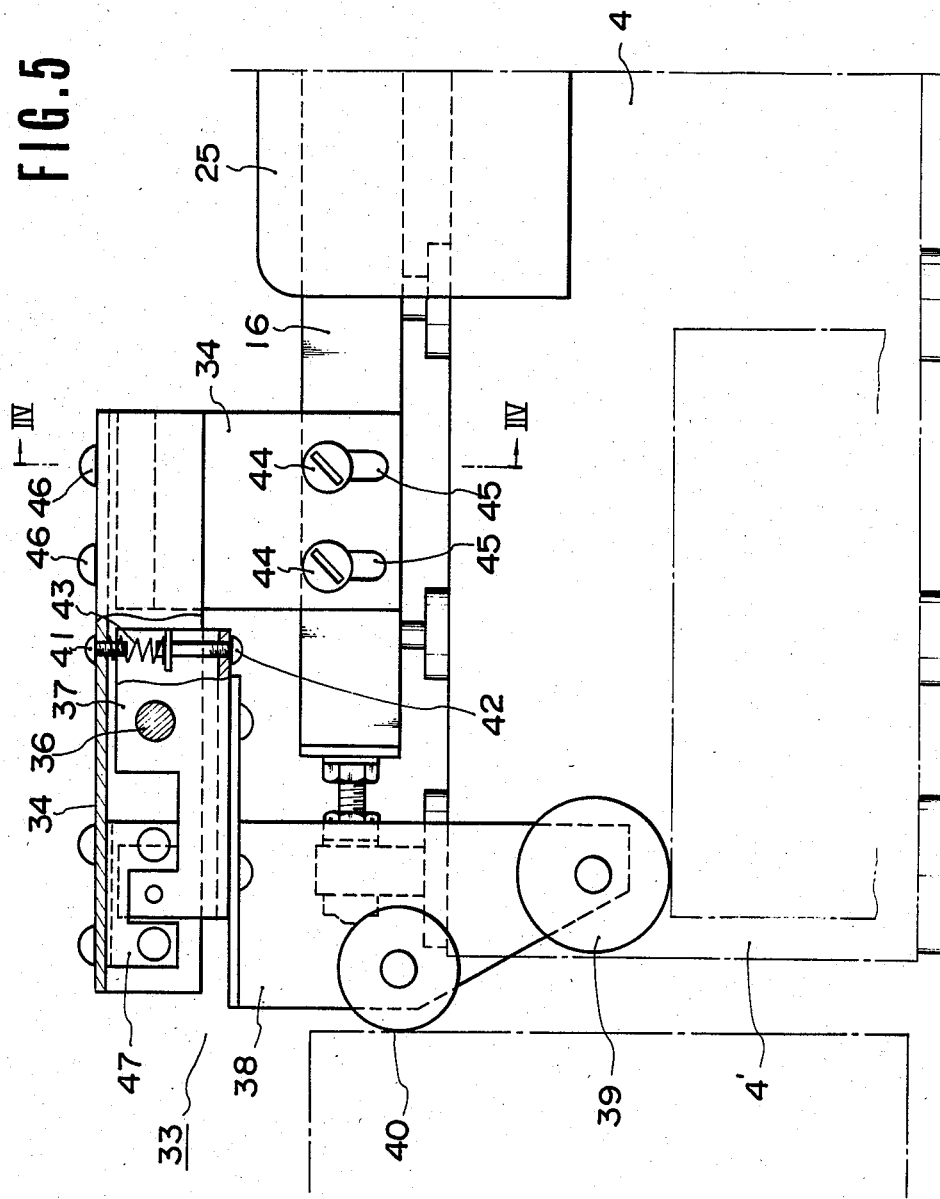
FIG. 5 is an enlarged plan view of a principal portion of the embodiment.

The posture control unit 33 consists, as shown in FIGS. 5 and 6, of a support member 35 attached to an inner side frame 16 of the turn conveyor 4 by a mounting member 34, a pivotable base member 37 supported on the support member 35 by a support shaft 36, a pivotable member 38 attached to the pivotable base member 37, and two rollers 39, 40 supported rotatably on the pivotable member 38.

The pivotable base member 37 and the rollers 39, 40 can rotate together about the support shaft 36 from a position in which these parts project at right angles to and toward the center of the turn conveyor 4, as shown in FIG. 5, to a position downstream of the conveyor 4.

A spring 43 supported on screws 41, 42 is provided between the support member 35 and the pivotable base member 37 to urge the parts 37, 38, 39, 40 in the direction in which theseparts project at right angles to and toward the center of the turn conveyor 4, as shown in the drawing, with one end of the pivotable base member 37 in contact with the support member 34 and not moving.

One roller 39 of the rollers 39, 40 is supported by a shaft on the free end of the pivotable member 38, and the other roller 40 is also supported by a shaft on a portion of the pivotable member 38 which is closer to the inner side of the conveyor 4 than the roller 39, and which is slightly upstream of the roller 39 with respect to the longitudinal direction of the conveyor 4.

Holes 45 provided in the mounting member 34 for passing set-screws 44 therethrough to attach the mounting member 34 to the frame 16 are elongated in the lateral direction of the conveyor 4.

As shown in FIG. 7, holes 45 provided in the support member 35 for passing set-screws 46 therethrough to attach the support member 35 to the mounting member 34 are elongated in the vertical direction.

Thus, the positions of the support member 35, the pivotable members 37, 38 and the rollers 39, 40 with respect to the conveyor 4 can be regulated in the lateral and vertical directions of the conveyor 4.

The posture control unit 33 is also provided with a sensor 46. The sensor 46 is a photoelectric sensor consisting, as shown in FIG. 6, of a C-shaped mounting member 47 attached to the support member 34, a light-emitting element 48 provided on a lower surface of the mounting member 47, and a light-receiving element 49 provided on an upper surface of the mounting member 47 so as to face the light-emitting element 48.

When the pivotable base member 37 moves, a light-shielding portion 50 provided thereon stopes or permits the passage of the light from the light-emitting element 48 to the light-receiving element 49 to detect the pivotal movement of the member 37.

Figure 9:
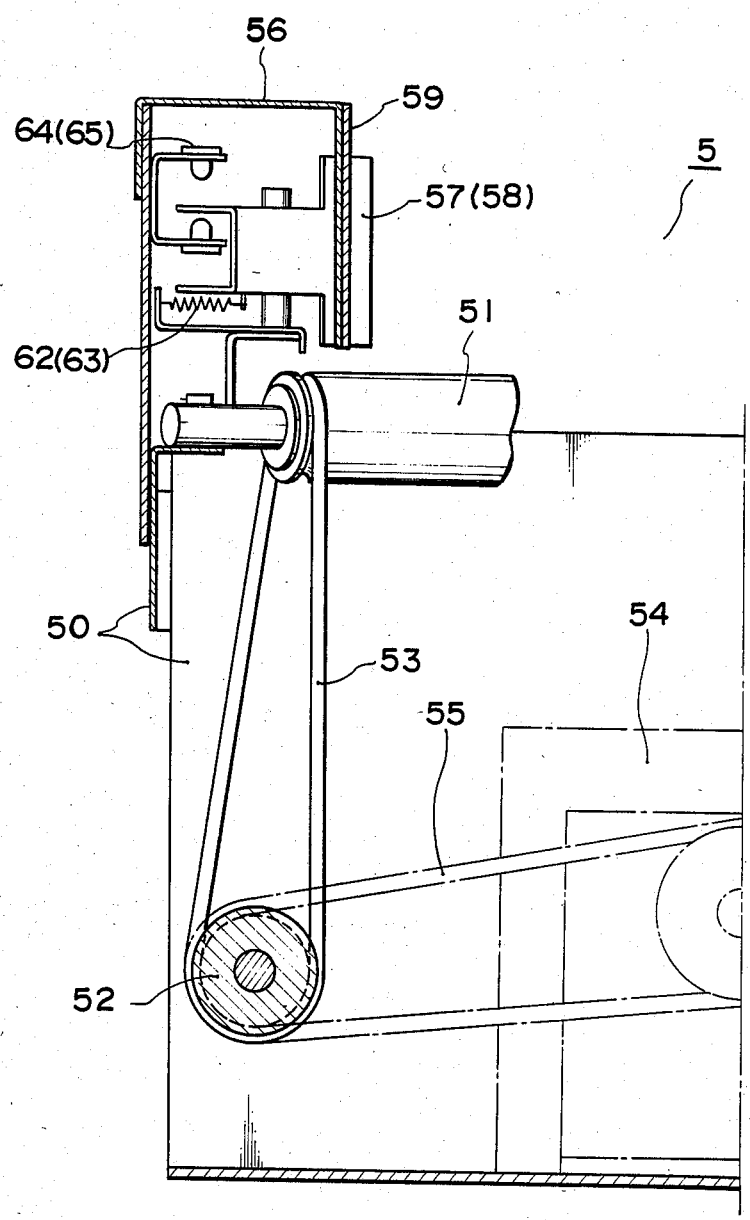
FIG. 9 is a longitudinal section through a principal portion of the alignment conveyor, taken along the side line of FIG. 5.

The alignment conveyor 5 connected to the terminal end 4" of the turn conveyor 4 consists, as shown in FIGS. 8 and 9, of a box frame 50, a plurality of rollers 51 arranged diagonally on an upper surface of the frame 50, belts 53 wrapped around the rollers 51, intermediate rollers 52 provided in a lower portion of the frame 50, and belts 55 wrapped around the intermediate rollers 52 and a motor 54.

The rollers 51 are all rotated at the same time by the motor 54 via the belts 55, the intermediate rollers 52, and the belts 53 to generate a diagonally forward article-transferring force.

A guide member 56 is provided on a surface of the side portion of the frame 50 which receives this diagonally forward article-transferring force.

The terminal end 5" of the alignment conveyor 5 is provided with two sensors 57, 58.

The sensors 57, 58 have pivotable members 60, 61 projecting from a guide surface 59 of the guide member 56.

When these members 60, 61 are turned in the direction C in FIG. 8 against springs 62, 63 by an article moving along the guide surface 59, the pivotal movements of the members 60, 61 are detected by photosensors 64, 65, respectively.

Figure 10:
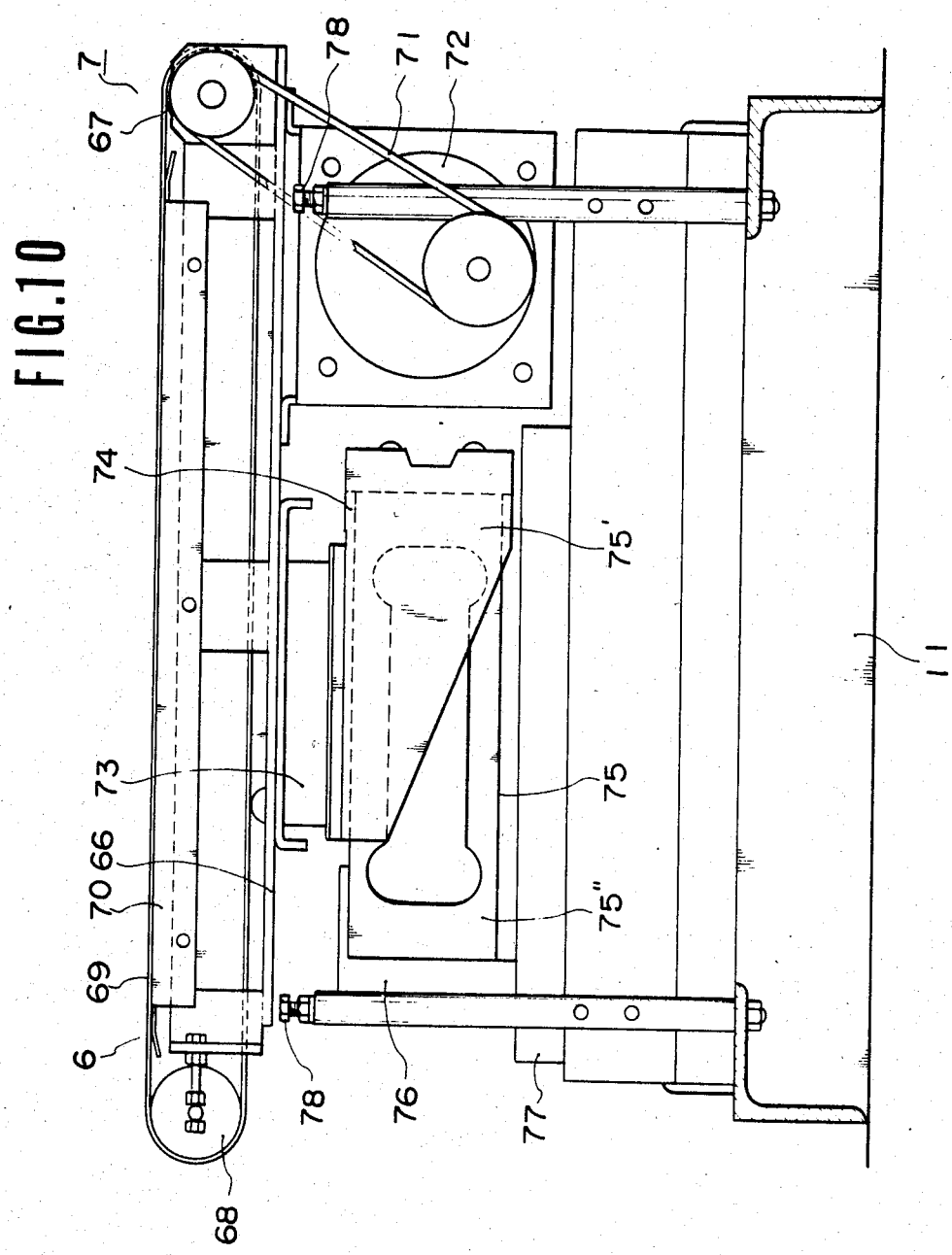
FIG. 10 is an enlarged side elevation of a weighing machine.

The weighing machine 7 provided with the weighing conveyor 6 connected to the terminal end 5" of the alignment conveyor 5 is constructed as shown in FIG. 10.

The weighing conveyor 6 consists of a conveyor frame 66, driving and driven rollers 67, 68 supported rotatably on the frame 66, a belt 69 wrapped around the rollers 67, 68, a member 70 attached to the frame 66 so as to support the upper portion of the support the upper portion of the belt 69, and a motor 72 attached to the frame 66 which rotates the driving roller 67 via a belt 71.

The weighing conveyor 6 is attached to a movable end portion 75' of a load cell 75 by a spacer 73 and a bracket 74, and a fixed end portion 75" of the load cell 75 is fastened to a base 77 by a bracket 76, so that the loads of the weighing conveyor 6 and the article placed thereon can be applied to the load cell 75.

Stoppers 78 preventing any overload on the load cell 75 are provided below the four corners of the frame 66 of the weighing conveyor 6.

A discharge conveyor 8 connected to the weighing conveyor 6 is provided on the downstream side of the weighing machine 7. The discharge conveyor 8 is constructed in the same manner as the turn conveyor 4. Namely, as shown in FIG. 1, a driving roller 82 is rotated via a belt 81 by a motor 80 mounted on a frame 79, to drive a belt 84 wrapped around the roller 82 and a driven roller 83.

A photosensor 85 which detects the entry of an article onto the discharge conveyor 8 is provided in the vicinity of a start end 8' thereof. In addition, an inclined discharge plate 86 is provided extending forward from a terminal end 8" of the discharge conveyor 8, and attached to the frame 79.

In addition to this arrangement, the labeling machine 9 and the control box 10 are provided on a support base 87 above the discharge conveyor 8 on the stand 11.

Figure 11:
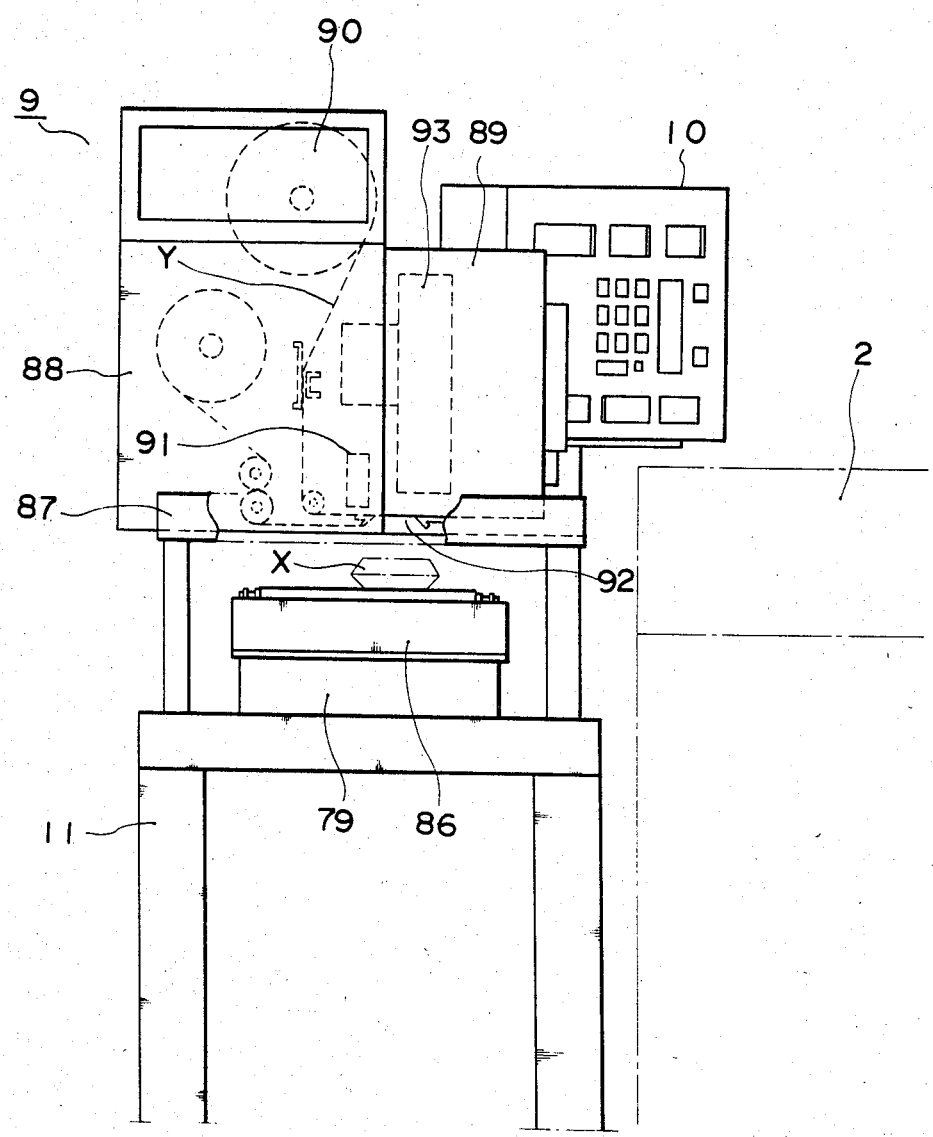
FIG. 11 is front elevation of a labeling machine and its surroundings.

The labeling machine 9 consists, as shown in FIG. 11, of a printer 88 and a pasting unit 89.

The printer 88 is constructed in such a manner that a label sheet Y consisting of a narrow strip of backing paper with a plurality of labels attached thereto is fed from a feed section 90 to a printer section 91, in which the total price, weight and unit price of the merchandise are printed on a label, which is then peeled from the backing paper and transferred to the pasting unit 89. The pasting unit 89 temporarily holds the label transferred from the printer section 91 by vacuum, and then sticks it onto the article X by air ejected from a blower 73 onto the label.

The operation of the above embodiment will now be described.

When articles X placed in trays are arranged in order in the feed section 12, as shown in FIG. 2, each article X is covered from above with stretched film in the packaging section 13 and the end portions of the film are folded under the base of the tray.

The end portions of the film on the base of the tray are thermally fused on the underside of the tray in the sealing section 14, so that the article X is packaged into a sealed pack. The article X thus packaged is discharged in a lateral posture from the discharge conveyor 15 of the sealing section 14 and is transferred to the turn conveyor 4 via the intermediate conveyor 3. Since the posture control unit 33 is provided at one corner of the start end 4' of the turn conveyor 4, one corner portion or one end portion of a longer side of the article X touches the rollers 39, 40 of the posture control unit 33 provided at an inner corner of the start end 4' of the turn conveyor 4.

Consequently, only the outer side of the article is moved forward, since the corner portion or the end portion of the inner longer side thereof engages with the rollers 39, 40.

Thus, an article which is in a lateral posture can be re-orientated into a longitudinal posture. During this time, the rollers 39, 40 and the pivotable members 37, 38 are rotated toward the downstream end of the conveyor 4 by the impact pressure occurring when the article comes into contact with the rollers and by the article-transferring force of the conveyor 4, against the force of the spring 43.

This enables a reduction in the impact force with which the article comes into contact with the rollers 39, 40 and the posture of the article can be changed smoothly and naturally.

The article X then passes in a longitudinal posture between guide members 25 and 25 provided on both sides of the turn conveyor 4, and is transferred to the alignment conveyor 5.

On the alignment conveyor 5, in which a plurality of rollers 51 are arranged diagonally, the article X is sent in the diagonally forward direction to touch the guide member 56, which is provided on the side toward which the article X is moved by the rollers 51 of the conveyor 5, and advances forward along the guide surface 59 of the guide member 56.

Consequently, the article X is sent to the weighing machine 6 and the labeling machine 9 still in the longitudinal posture with one side thereof correctly positioned. On the alignment conveyor 5, one side of the article X is always set in a predetermined position, irrespective of the size of the tray used.

In the weighing machine 6, the article X sent thereto from the alignment conveyor 5 is placed on the weighing conveyor 7 and its weight is measured. The weight is input in the form of an electrical signal to the printer 88 in the labeling machine 9.

In the printer 88, the weight is multiplied by a unit price (a price per unit weight), which has been input previously, to determine the total price, and the total price, weight and unit price, and other details are printed on a label.

During this time, the article X is being transferred from the weighing conveyor 7 in the weighing machine 6 to the discharge conveyor 8.

When the article X passes under the pasting unit 89 in the labeling machine 9, the label on which the total price thereof and characters indicating other information are printed, is stuck onto the article.

Since the article X is set in the correct posture and position by the turn conveyor 4 and alignment conveyor 5, the label is inevitably stuck onto a predetermined portion thereof when the article passes under the pasting unit 89.

The operation of the sensors 46, 57, 58 and 85 during these article-transferring actions of various parts of the apparatus will now be described.

The sensor 46 provided in the posture control unit 33 in the turn conveyor 4 temporarily stops the turn conveyor 4 and the conveyors on the downstream side thereof, i. e. the alignment conveyor 5, the weighing conveyor 6 and the discharge conveyor 8, when the pivotal movement of the posture control unit 33, i.e. the supply of articles from the intermediate conveyor 3 to the turn conveyor 4 is stopped for a predetermined period of time. This can prevent the unnecessary operation of these conveyors and wasteful power consumption.

The sensor 58 positioned on the side of the terminal end 5" of the alignment conveyor 5 detects an article passing it and stops the weighing conveyor 6 when a predetermined period of time has elapsed after the passage of the article has been detected, i.e. when the article is positioned on the weighing conveyor 6, so that the article can be weighed accurately by the weighing machine 7 with the article halted.

The sensor 57 provided on the portion of the alignment conveyor 5 which is upstream of the sensor 58 stops the alignment conveyor 5 immediately the sensor 57 detects an article passing it when the previous article is still on the weighing conveyor 6 (the information that the previous article is on the weighing conveyor 6 is obtained by a signal from the weighing machine 7). This can prevent the placing of two articles on the weighing machine 7 at once, and the resultant measurement error.

The sensor 85 provided at the start end 8' of the discharge conveyor 8 detects an article passing it and sends a signal to the pasting unit 89 in the labeling machine 9.

Sensor 85 enables the labeling action of the pasting unit 89 to be timed to the passage of the article past the sensor 85, so that the label is stuck on a predetermined longitudinal portion of the article.

In the above embodiment, a U-shaped intermediate conveyor 3 is used to form a U-shaped article-transferring passage. The packaging machine 2 and the turn conveyor 4 may be connected directly by omitting the conveyor 3, or an intermediate conveyor capable of turning through 90° can be used, to form a rightangle article-transferring passage.

In such cases, the turn conveyor 4 can also be connected freely to a packaging machine or intermediate conveyors of various shapes, since the turn conveyor 4 is so constructed that the height of the start end 4' thereof can be regulated.

According to the present invention described above, a novel apparatus is constructed so that it can continuously carry out the operations of packaging, weighing and labeling merchandise placed in trays, in which a label with a total price and other details printed thereon can be stuck onto the correct position of an article reliably at all times, irrespective of the size of the tray used.

This apparatus enables the omission of the manual operation of correcting the posture and position of articles being transferred, an improvement in the operation efficiency, and the elimination of labeling errors.

According to the embodiment of the present invention, the layout of the apparatus as a whole can be determined correspondingly to the area and shape of the space available.

What is claimed is:

1. An apparatus for packaging, weighing and labeling merchandise wherein the operations of packaging, weighing and labeling merchandise are carried out continuously, comprising a packaging machine; a turn conveyor connected to a discharge section of said packaging machine and which is provided with a posture control unit for re-orientating merchandise sent out in a lateral posture from said packaging machine into a longitudinal posture; an alignment conveyor connected to said turn conveyor and having at one side a guide wall along which said merchandise is aligned; a weighing machine provided with a weighing conveyor connected to said alignment conveyor; a discharge conveyor connected to said weighing conveyor of said weighing machine; and a labeling machine provided above said discharge conveyor which sticks onto said merchandise passing along said discharge conveyor labels on which prices corresponding to the actual weights of said merchandise are printed.

2. The apparatus for packaging, weighing and labeling merchandise according to claim 1, wherein said turn conveyor includes height control means for regulating the height of a start end thereof so as to make the height of said start end of said turn conveyor equal to that of said discharge section of said packaging machine.

3. The apparatus for packaging, weighing and labeling merchandise according to claim 2, wherein said height control device comprises means, connected between the discharge end of said turn conveyor and the feeding end of said alignment conveyor, for pivotably mounting the former to the latter, and a screw rod connected between said mounting means and said alignment conveyor feeding end for pivotably adjusting said turn conveyor relative to said alignment conveyor.

4. The apparatus for packaging, weighing and labeling merchandise according to claim 1, wherein said alignment conveyor consists of a frame, a plurality of rollers arranged diagonally on an upper surface of said frame, and a guide member set on a surface of the side portion of said frame.

5. The apparatus for packaging, weighing and labeling merchandise according to claim 4, wherein said rollers are connected by belt means mounted between each roller and a rotary intermediate roller driven by a motor.

6. The apparatus for packaging, weighing and labeling merchandise according to claim 1, wherein said posture control unit consists of a support member attached to one side of said turn conveyor; a member supported pivotably on said support member in such a manner that said pivotable member is urged by a spring so as to be kept normally in a condition in which said pivotable member projects toward the center of said conveyor, and in such a manner that said pivotable member can be rotated from a position in which said pivotable member projects toward the center of said conveyor to a position toward the downstream end of said conveyor; rollers supported rotatably on said pivotable member and which are adapted to receive a corner portion of an article being transferred in a lateral posture from the upstream end of said turn conveyor; and a sensor for detecting the movement of said pivotable member when said article contacts said rollers.

7. The apparatus for packaging, weighing and labeling merchandise according to claim 6, wherein the position of said support member is adjustable.

* * * * *